May 18, 1954     H. SCHMID ET AL     2,678,739

FEEDING DRUM AND CHUTE

Original Filed Dec. 16, 1949     3 Sheets-Sheet 1

INVENTORS
*Herman Schmid*
BY *Albert P. Hobush*
*William F. Nickel*
ATTORNEY

May 18, 1954 H. SCHMID ET AL 2,678,739
FEEDING DRUM AND CHUTE
Original Filed Dec. 16, 1949 3 Sheets-Sheet 2

INVENTORS
Herman Schmid
BY Albert P. Hobush
William F. Nickel
ATTORNEY

May 18, 1954   H. SCHMID ET AL   2,678,739
FEEDING DRUM AND CHUTE

Original Filed Dec. 16, 1949   3 Sheets-Sheet 3

INVENTORS
Herman Schmid
BY Albert P. Hobush
William F. Nickel
ATTORNEY

Patented May 18, 1954

2,678,739

UNITED STATES PATENT OFFICE 2,678,739

FEEDING DRUM AND CHUTE

Herman Schmid and Albert P. Hobush, Kingston, N. Y., assignors to Incro, Inc., Kingston, N. Y., a corporation of New York Original application December 16, 1949, Serial No. 133,427. Divided and this application August 21, 1951, Serial No. 242,851

11 Claims. (Cl. 214—17)

This invention relates to an improved roasting machine to be used in connection with the retail distribution of coffee by enabling a dealer to keep green coffee in stock and roast it as required or on each sale, so as to be able to offer perfectly fresh roasted coffee to individual customers.

An object is to provide a coffee roasting machine having a hopper containing coffee to be roasted, and parts for delivering a predetermined quantity from the hopper to the roasting member when the temperature within the member reaches the proper heating level.

Another object is to provide a coffee roasting machine with hopper and parts comprising a rotatable drum between the hopper and the roasting member, in combination with a chute which is moved to connect the loaded drum with the roasting member at the beginning of each operation; and thus charge the member with coffee to be roasted.

Yet a further object is to provide a coffee roaster having a chute to deliver the coffee to the roasting member, and parts for shifting the chute after the roasting into position to deliver the coffee to a bin or receptacle.

The nature of the invention is fully described hereinafter and the preferred form of the invention is illustrated in the accompanying drawings. But this disclosure is explanatory only, and we may vary details of construction without departing from the principle of the machine.

This application is a division of our application Serial No. 133,427, for a Coffee Roaster, filed December 16, 1949.

Figures 1, 7:
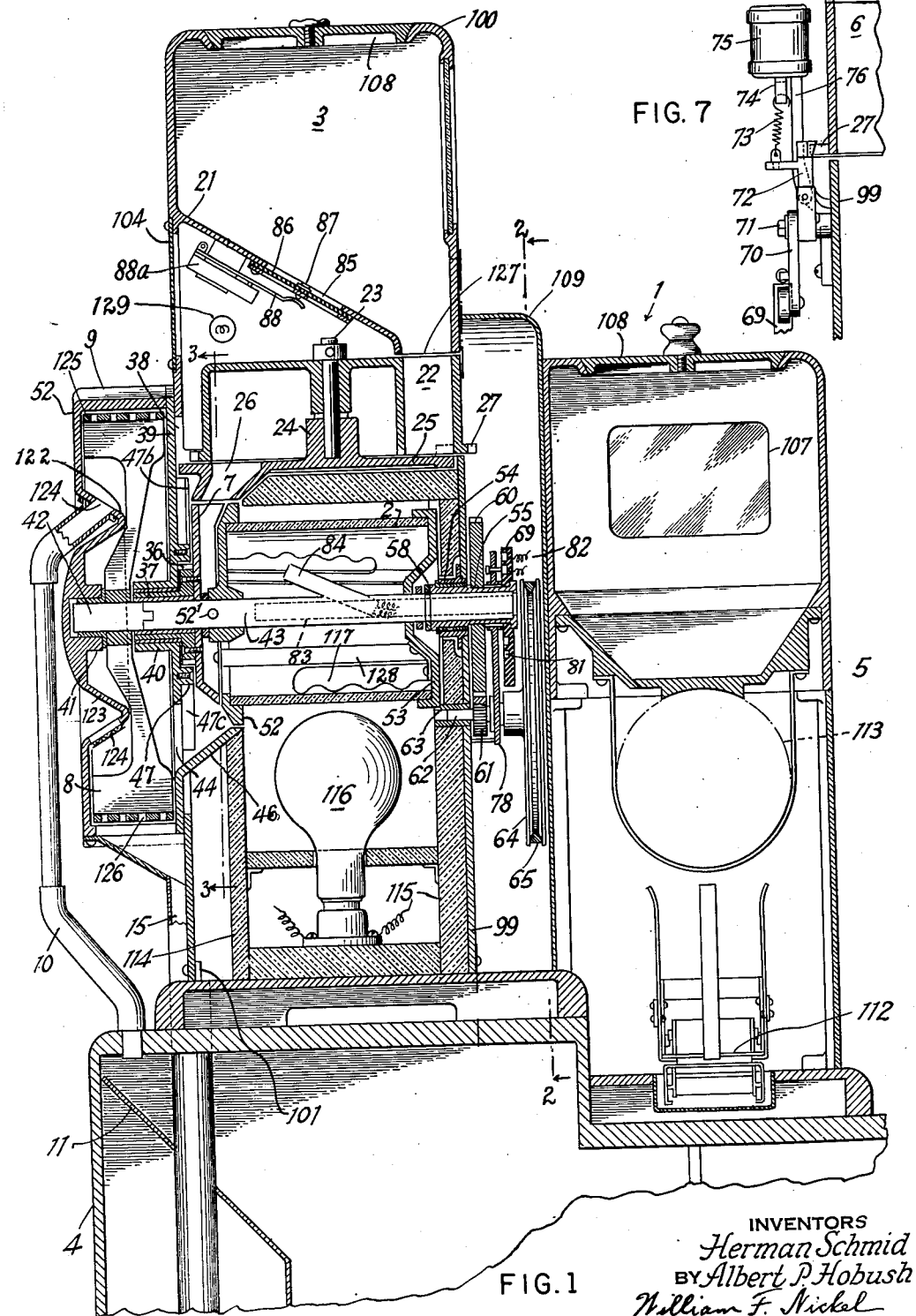
Figure 1 is a vertical longitudinal section taken through a coffee roasting machine containing our invention.
Figure 7 illustrates a detail.

The roaster and its adjuncts comprise a housing 1. The coffee is roasted in a heater consisting of a chamber enclosing a rotating cylinder 2. At the top of the housing is a bin or hopper 3 for the green coffee beans, which are transferred to the heater; and afterwards piled in the base or lower part 4 of the roaster; from which they are lifted by a suitable conveyor, to be ground in a casing or section 5. The passage of the green coffee from the bin 3 to the roasting cylinder 2 is regulated by a measuring drum 6; and the admission of the unroasted beans to the cylinder 2 is controlled by a chute 7, which automatically assumes loading and discharge position at the beginning and end of each roasting cycle. When the contents of the cylinder 2 have been treated as required they are delivered to an agitator 8 in a casing 9 on the housing 1, and finally dropped through a conduit 10 into the base section 4, which contains an inclined plate 11 which directs the roasted beans into a suitable receptacle.

To the casing 9 of the agitator is connected a conduit 15, through which the husks covering the roasted beans are discharged into a removable drawer (not shown) at the bottom of the roaster. The vapors of the coffee when being roasted are drawn off through a flue 17 into a casing 18 containing a fan 19; and conducted away through a flue 20. The flue 17 of course leads from the heating chamber.

The hopper 3 for the green coffee has a sloping bottom 21 with a delivery opening at one side to register with a pocket or chamber 22 in the measuring and loading drum 6, that is just above the roasting cylinder 2. This drum is mounted to turn on a stud or journal 23, in a projection or foot bearing 24 in the housing. This bearing is part of a fixed horizontal transverse partition 25 in the housing over the cylinder 2. The chamber 22 is open at the upper and lower end, and after receiving coffee from the bin or hopper 3, the drum 6 turns and discharges the green coffee beans through an outlet 26 in the partition 25. The top of the drum 6 is closed except for the pocket 22, and at the bottom thereof are external gear teeth 27 extending entirely around the circumference thereof to be engaged by a pivoted pawl at the end of a rocking lever to be described later for effecting rotation of the drum as required. The teeth 27 have inclined forward and abrupt rear faces.

Figure 6:
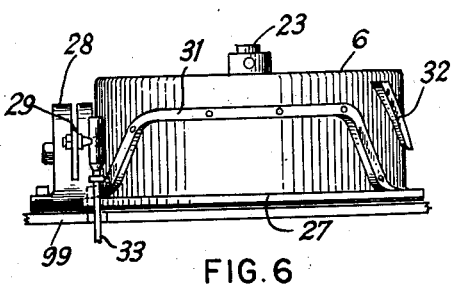
Figure 6 is a side view of the controlling drum with cam ribs thereon.

Affixed to the partition or floor 25 under the hopper 3 is a bearing lug 28 carrying a bolt or screw which serves as a pivot or fulcrum for a rocker or lever arm 29 having at one end a roller 30. This roller engages a cam track 31 (Figure 6) on the cylindrical outer face of the drum 6. This track is level at the top, but its ends are inclined in opposite directions. At the rear of the cam track is an inclined guard rib 32 on the drum to depress the lever 29. The opposite end of the lever 29 is pinned to a rod 33 which passes down through an opening in the floor 25 and is pinned at its lower end to a segmental gear 34, mounted on a fixed journal 35. (See Figure 3.) The journal is between the gear teeth and the point of connection of the gear to the rod 33. This gear 34 meshes with a pinion 36 having a hub 37 that is concentric with the axis of the roasting cylinder 2.

In line with the cylinder 2, the wall of the housing has a large opening 38, which is closed by the casing 9 of the agitator 8. Over this opening between the casing 9 and housing 1 lies the closure plate 39 for the inner end of the casing 9, having a hollow boss 40 in the center which bears the hub 37 of the gear 36. The casing 9 has a central bearing 41 in the outer end supporting one end of a stub shaft 42 upon which the agitator is mounted. This shaft has keyed connection with the end of the shaft 43 carrying the roasting cylinder 2. At the side of the plate 39 is an arc-shaped opening 44 extending from a point about the level of the shaft 43 down past a point directly below it. The plate 39 carries the bearing 40 at the center. The free end of the chute 7 as it rotates, discharges the contents of the cylinder through it into the casing 9 when the roasting is finished.

The plate 39 has a fixed curved conical inner rim or flange 46 around the edge of the opening 44 nearest the circumferential edge of the plate 39, and projecting into the housing as far as the adjacent end of the cylinder 2; beyond the rotatable chute 7. This rim 46 is about as long as the opening 44 and can be welded in place on the plate 39. Also on the face of the plate 39 presented to the chute, is a rib 47 encircling the gears 34 and 36; the plate 39 bears the pivot stud 35 for the gear 34 in the space surrounded by the rib 47. Over the rib 47 and the gear 34 lies a thin cover plate 47b with a curved slot 45. The pin 35 joining the rod or link 33 to the gear 34 projects through this slot, so that the rod is in the free space between the cover plate 47b and the chute 7. The cover plate 47b has a large opening for the gear 36. The chute 7 is made rigid with the gear 36. The rib is widened above and below the thinned area 47a; presenting vertical shoulders 47c.

On the face of the cover plate 47b is another plate 49, having a conical rim 50 along one edge which forms a continuation of the rim 44 from the lower end thereof up to the outlet 26 for the drum 6. At both ends of the rim 49 are projections 51 that enable the plate 49 to be bolted or otherwise secured over to the rib 47 to the plate 39. The rim 50 is cut away on its outer edge adjacent the slot 45 to give clearance to the rod 33.

Figure 5:
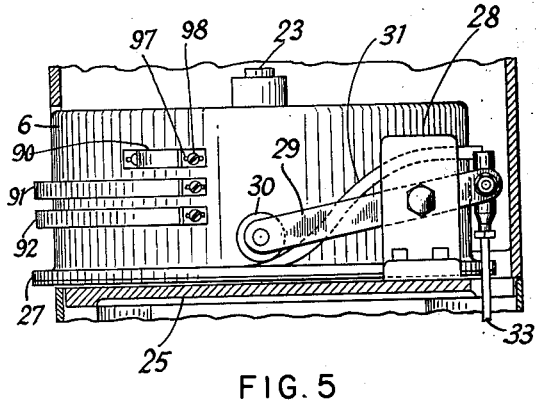
Figure 5 is a section of a detail, on line 5—5 of Figure 3.

The end of the cylinder 2 adjacent the chute 7 has an open spider 52 through which it discharges. This spider is covered by the chute 7 in the position shown on Figure 3 when the cylinder 2 is loading. The roller 30 then runs on the tops of the teeth 27, the lever being depressed and the rod lifted as in Figure 5.

When the drum 6 revolves it fills with green coffee from the hopper 3, the coffee dropping into the pocket 22 at each revolution; and the coffee is discharged as the drum rotates and the pocket comes into registry with the outlet opening 26 in the partition 25. While the drum is turning, the roller also runs on the cam 31, and depresses the rod 33 which rises again when the end of the cam is reached and the roller is depressed by the rib 32. The gear 34 thus oscillates the gear 36 through a part turn each time, so that the chute 7 registers with the outlet 26 to fill the cylinder 2 and then makes a part turn to its lowermost position to guide the roast coffee from the cylinder 2 into the casing 9 through the long arc-shaped opening 44.

The opposite end of the shaft 43 is enveloped by a sleeve 55. The shaft has key or clutch connection (not shown therewith). The sleeve will therefore turn the shaft but the shaft can be detached from the sleeve like the stub shaft 42.

The end of the cylinder 2 adjacent the sleeve 55 is closed by a flanged-over metal disk or plate 53, and the sleeve 55 is mounted in a suitable bushing or bearing 54 in the adjacent wall of the housing. The cylindrical wall of the cylinder 2 is made of heat resistant material 56, and the plate 53 has a disked central part through which the shaft 43 passes. The shaft 43 has a spring washer and nut indicated at 58 between the sleeve 55 and the disk 53 to press against the disk and hold it in place on the cylinder 2.

The spider 52 is fixed to the shaft 43 at the end of the cylinder adjacent the chute 7. When the casing 9 is dismounted, the stub shaft 42 can be removed with it, and when the plate 39 is taken off the housing, the cylinder 2 can be pulled out through the opening 39. The main part of the shaft 42 then comes out with the cylinder, being pulled out of the sleeve 55 which can remain in place, but can also be taken out when necessary.

Figure 2:
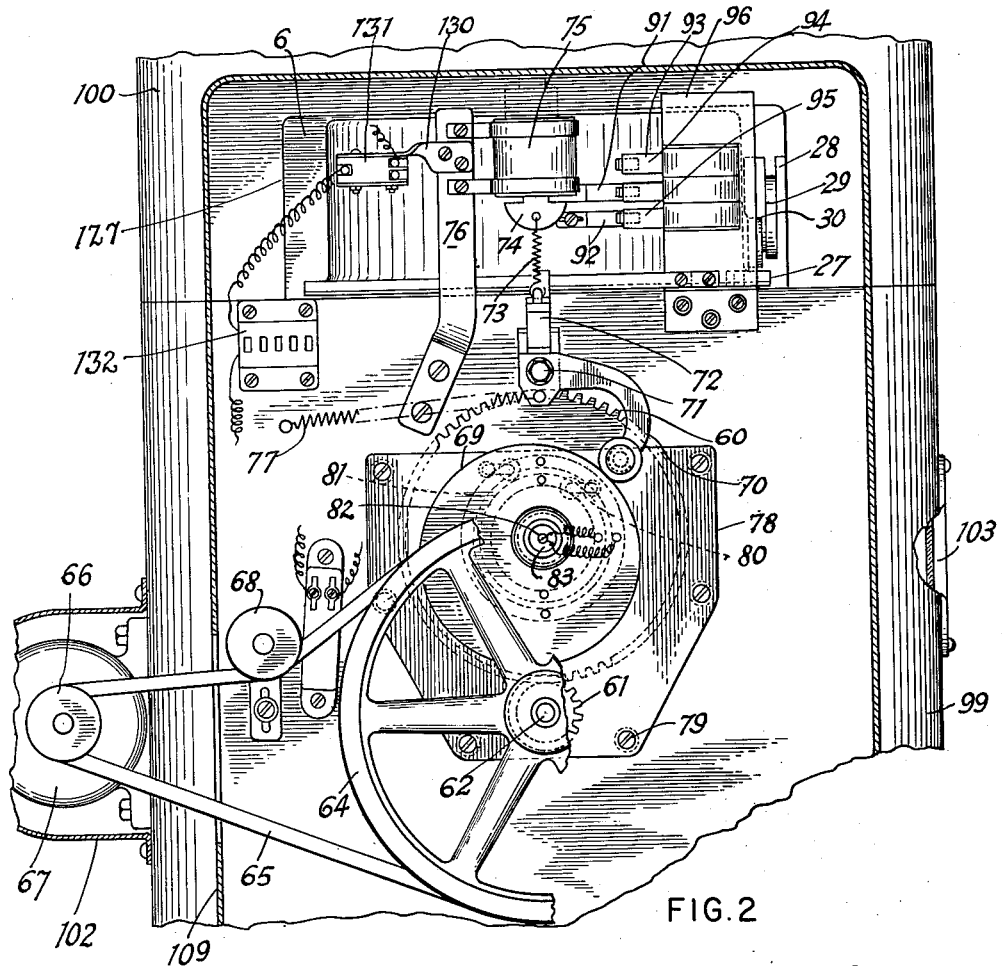
Figure 2 is a section on line 2—2 of Figure 1, showing part of the operating mechanism of the apparatus.

The outer end of the sleeve 55 carries a gear 60, which is turned by a gear 61 on a shaft 62, mounted in a bearing 63 in the wall of the housing 1. On the outer end of this shaft is a pulley 64, which is rotated by a belt 65. This belt is operated by a pulley 66 of an electric motor 67 on the outside of the housing; and a belt tightening pulley 68 may be mounted on the housing to keep the belt in firm engagement with the pulleys 64 and 66. Fixed to the outer end of the sleeve 55 to be rotated thereby, between the pulley 64 and the gear 60, is a cam 69, which operates a rocker lever 70 on a pivot pin 71. See Figures 2 and 7. This lever carries at its outer end a pivoted pawl 72. To the pawl is attached a spring 73 which connects the pawl to the plunger 74 of a solenoid 75. Normally the pawl is not in position to engage the teeth 27 of the drum 6, but when the solenoid is energized, the plunger 74 pulls the spring 73 so that the upper end of the pawl will push against the teeth and turn the drum every time the lever 70 rocks. On the reverse movement of the lever, the pawl slips idly back over the inclined faces of the teeth 27. The solenoid is supported by a bracket 76 on the framework of the housing, secured thereto by any suitable means; and the lever is actuated by the cam 69 against the tension of a spring 77 fixed to the lever and the housing 1, which of course mounts the pivot pin 71.

The outer end of the sleeve 55 also passes through a plate 78 of aluminum. This plate also has a bearing in its lower end for the outer end of the shaft 62 carrying the gear 61. The plate is secured to the housing by screws 79 and is between the gear 60 and the cam 69. Mounted on the plate are binding posts 80, to engage slip rings 81 on the cam 69. These rings are connected by wires 82 which pass into the cylinder 2 through a bore 83 in the shaft 43 and connect to a thermostat member 84 in the cylinder 2, being formed into a cable 82 in the bore 83.

In the sloping bottom 21 of the hopper is an opening 85 which is covered by a flexible diaphragm 86. At the center of this diaphragm is a fixed terminal 87 which cooperates with a movable switch terminal 88. When the hopper contains more than a minimum quantity of coffee, the terminals 87 and 88 are closed by the weight of the required quantity of green coffee in the bin 3, but when this quantity is not present, the terminals 87 and 88 separate and the operation of the roster stops.

The terminal 88 is mounted on an insulating member 88a carried by the bottom of the bin 3 on its lower face.

The cylindrical surface of the drum 6 has three cams 90, 91 and 92 at the beginning of the cam track 31 on the drum. The first cam is a short one, but the other two are long, and they are all flush with one another at the ends adjacent the rising part of the track 31. These cams control switches 93, 94 and 95 respectively, in circuits which are described in our prior application aforesaid herein. The switches are mounted on a post 96 on the partition 25. The cam strips have slotted ends 97 which receive fastening screws 98 affixing them to the drum; and by virtue of slots in the ends of the cams receiving the screws, the positions of the cams can be adjusted.

Figure 3:
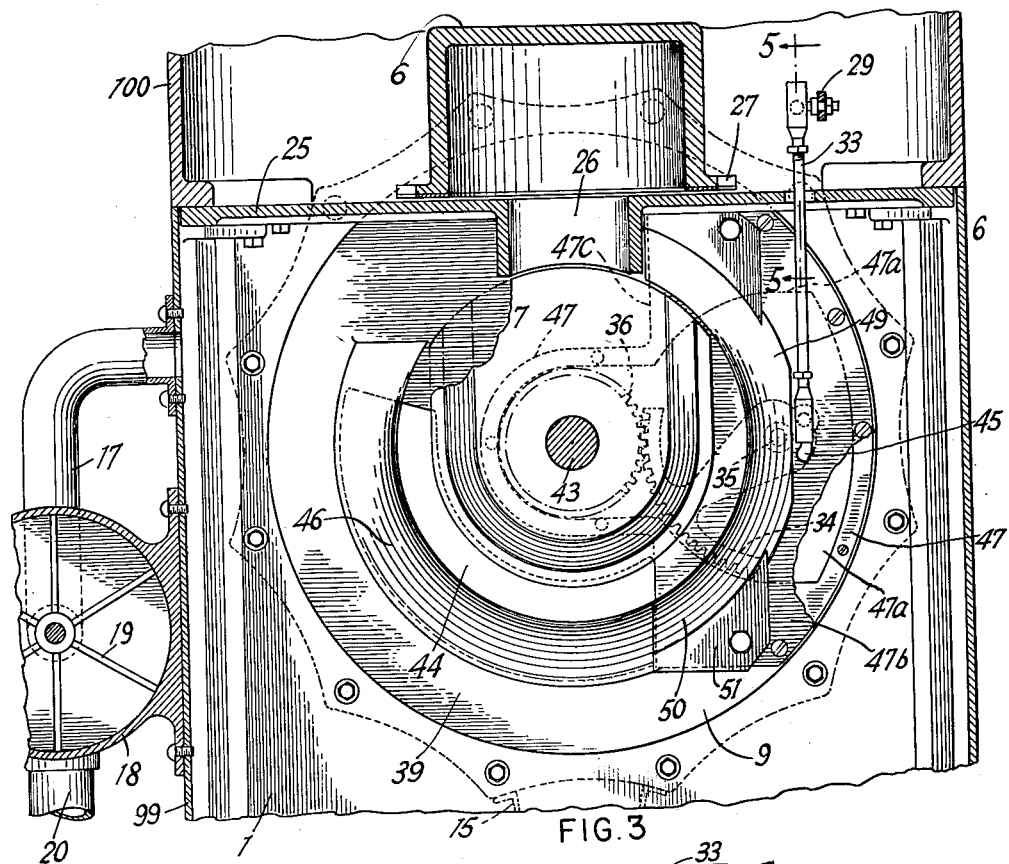
Figure 3 is a section on line 3—3 of Figure 1, showing more of the operating members.
Figure 4:
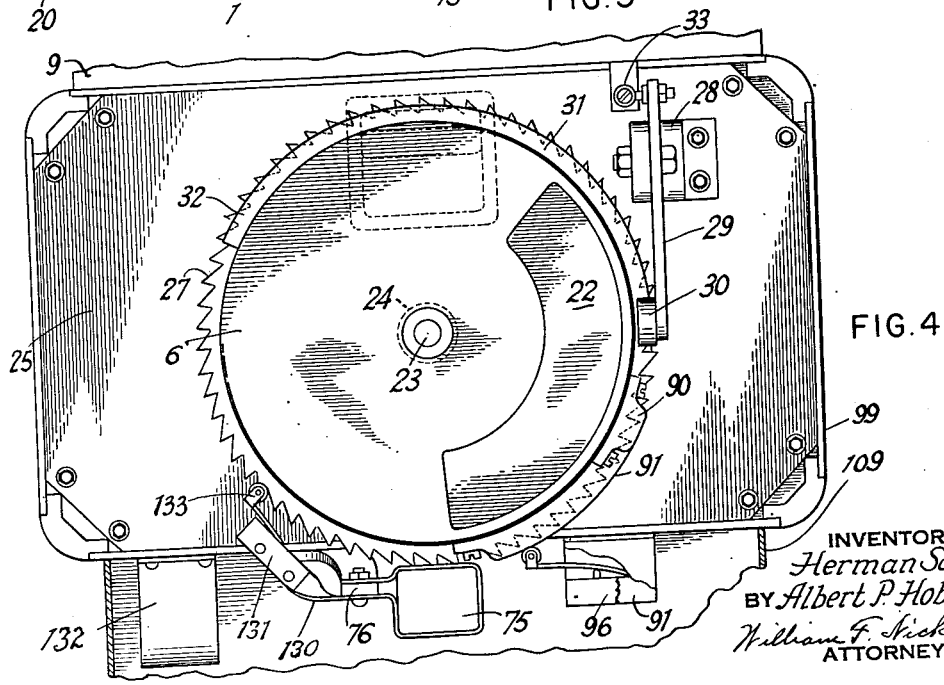
Figure 4 is a plan of the drum which controls the loading of the roaster.

The housing 1 comprises sections one of which 99 has the partition 25 as its top, and contains the roasting cylinder 2. To one outside face of this section 99, usually at the left of the operator (Figure 1) as he faces the front of the housing (Figure 1), the casing 9 is affixed. On the section 99 rests the upper section 100 containing the bin 3, and detachably secured to the section 99 in any suitable way. The section 99 stands on the base section; and is secured thereto as by lugs 101 on the base section 4, to be inside the section 99 at its lower edge, and attached by screws. (See Figure 1.) At the one side of the section 99, the top of the base section 4 is a little lower, and thereon stands the section 5. This section 5 is separated from the section 99, and the pulley and other parts on the outside of the section 99 shown in Figures 1 and 3 are between the sections 99 and 5.

The section 99 carries the motor 67, and casing 19 with fan 18 which, as shown in Figure 1, is driven by the motor 67, that is enclosed in a casing 102. The side of the section 99 opposite that bearing the motor 67, has a window 103, leading to the heating chamber containing the cylinder 2, and the section 100 has windows 104 and 105 above the casing 9 and section 5 respectively. The section 5 has one or more windows 107 near its top, which has a removable closure 108. The space between the sections 99 and 5 is filled by a removable shield 109 which covers the moving parts therein. The sections can easily be dismounted to give convenient access to all parts. The bin 3 also has a top opening with a closure 108.

The section 5 has a platform scale 112. This section contains the grinding mechanism and a motor 113 to operate it, and bears switch 114 and an ordinary electric outlet, not shown, for the prongs of a plug that is attached to a cord conductor so that electric current may flow to energize the motor inside. This grinding mechanism is fully disclosed and defined in our copending application for a separate patent thereon, Serial No. 133,426, filed December 16, 1949.

The inside of the section 99 constitutes a roasting chamber enveloping the cylinder 2. See Figure 1. One end of this is substantially closed adjacent the casing 9 by a partition 114 of heat insulating material. The top, bottom, sides and opposite end of this chamber within section 99 are of similar material, as indicated at 115. One or more heating lamps 116 are mounted at the bottom of this chamber and several resistance heaters 117 are mounted in it adjacent the roasting cylinder 2. The partition 114 has an opening at the top receiving the end 52 of the cylinder 2 and clearing the outlet 26 of the drum 6.

The inside of the casing 9 contains a central annular rib 122, which is conical on both faces and surrounds the bearing 41. At its topmost point this rib has an opening 124 in its outer face, to which the delivery pipe 10 is coupled. The roasted coffee beans are discharged through this opening down in to the base 4, but the husks are retained. These drop down to the bottom of the casing and fall into the flue 15. The agitator 8 has a circular ring 125 joining the outer ends of the vanes or blades and having openings 126 through which the pieces of the husks drop into the flue 15.

The arrangement of circuits, switches and other controlling devices is fully set forth in our aforesaid applicaition, Serial No. 133,427. When the main switch is closed and the weight of the coffee in the bin is sufficient to close the switch points 88a—88b, the lamps 116 and heaters will be energized. The motor 67 then starts and the cylinder 2 begins revolving.

When the motor starts, the drum does not at first rotate because the solenoid 75 is not energized. But as the temperature in the heating cylinder 2 increases, the thermostat 84 therein closes, and a circuit is established through suitable connections described in our application Serial No. 133,427 to the switch 94, now closed by cam 91. This action establishes another circuit the effect of which is such that any erratic operation due to "hunting" of the thermostat 84 as the temperature in the machine may vary is obviated.

At starting there is a warm-up period during which the switch 93 is held open by the cam 90. The feeding drum 6 is in such position, and the switches 94 and 95 are so constructed that the first is closed and the latter open, each with a roller on cams 91 and 92 respectively. As soon as current flows through the lamps 116 and heater members 117, and as the temperature in the roasting chamber or oven rises, the motor begins to rotate and turn the cylinder 2. The drum 6, however, does not revolve till later. Normally when the switches 94 and 95 do not have their rollers on the cams, the switch 94 is open and the switch 95 is closed; at the beginning the switch 94 is closed and switch 95 is open. At the end of the warm-up period the thermostat 84 closes; and as above stated the lamps 116 and heater members 117 are cut out; and erratic operation due to "hunting" of the thermostat is obviated as set forth above. Another circuit is then established through solenoid 75 to lift the plunger 74 and cause the pawl 72 to engage the teeth 27 on the drum 6. The feeding drum now rotates, bringing its pocket 22 over the outlet 26 to fill the cylinder 2 with green beans. The roller 30 rides on the tops of the projecting teeth 27 as the pocket 22 passes the outlet 26; hence the dumping rod 33 is lifted as in Figure 3 and the chute 7 is up and guides the green beans into the cylinder 2. These beans are cool, and they cause the temperature of the roasting chamber to drop, so that the thermostat 84 opens. The switch 94 has already opened because it has passed the cam 91, but the switch 95 is closed after leaving the cam 92. Through the switch 95 current flows to the solenoid 75, till in the rotation of the drum the green coffee has been delivered to the cylinder 2 and the thermostat 84 has cooled. The solenoid 75 is then de-energized and the drum stops, because the plunger 74 sinks and the pawl 72 swings back from the teeth 27. But now a heater circuit through the lamps 116 and heaters 117 is restored, and the motor 67 keeps running.

The cylinder 2 is thus kept rotating till the contents are fully roasted, and then the thermostat 84 again closes. The lamps 116 and heating devices 117 are cut out, as before, but the switch 94 is still open and the solenoid 75 now receives current by way of switch 95 which is still closed, and the drum again rotates. The lever 29 is lifted and the dump rod 33 lowered to swing the chute 7 into registry with the opening 44 so that the cylinder 2 can be emptied. When the cam 92 reaches the switch 95, this switch is opened, and no more current can flow by way of this switch to the solenoid 75. The drum then stops with switches 94 and 95 again on the front ends of the cams 91 and 92, and the pocket 22 in position to receive again from the bin or hopper 3. The operation can take place with switch 87—88 closed due to weight of beans on diaphragm. If this switch is open due to lack of beans by weight, the machine will finish roasting. The drum then rotates past roasting position, the circuit being broken by short cam 90 opening switch 91. At this point the drum has operated the dump lever 33, swinging the chute 7 down to position, and discharging the roasted beans. All circuits are broken except through the motor and blower which are kept in operation until the cylinder 2 cools.

The section 100 has an opening 127 at the front to expose the drum 6 and the cams thereon. As above stated, the part of the shaft 43 within the sleeve 55 is made separable like the end 42 for convenient dismounting of the cylinder 2. Vanes 128 in the cylinder agitate the coffee beans during roasting and are set on a diagonal to facilitate emptying the cylinder through the chute into the casing 9.

The upper section 100 has one or more lamps indicated at 129 inside adjacent one of the openings, such as the opening 104. This lamp is in circuit with the motor 67, and is illuminated as long as the motor is energized. A thermally responsive switch can be included in the circuit to make the lamp 129 flash instead of being steadily illuminated, if desired. Of course, such a lamp can be placed at any advantageous point in the section 100, and additional windows can be formed in the remaining sides of the section 100.

The bracket 76 supporting the solenoid 75 also mounts an arm 130 which carries a terminal element 13 to which the wires for the solenoid are attached. In the circuit of the apparatus is an electric counter 132. These parts are fully explained in our aforesaid application Serial No. 133,427, and are not included in the claims of this application. The arm 130 also carries a roller pawl 133 to engage the teeth 27 and hold the drum 6 motionless when the pawl 72 is out of operating position.

Having described our invention, what we believe to be new is:

1. Roasting apparatus comprising a horizontal cylinder, a hopper above said cylinder, a controlling member between the hopper and the cylinder, said member being mounted to rotate about a vertical axis, a casing into which the cylinder delivers, a movable chute adjacent the cylinder, means for operating said member, and means for actuating the chute to guide a charge into the cylinder before roasting and from the cylinder into said casing when the roasting operation is finished.

2. Roasting apparatus comprising a horizontal cylinder, a hopper above said cylinder, a controlling member between the hopper and the cylinder, said member being mounted to rotate about a vertical axis, a casing into which the cylinder delivers, a movable chute adjacent the cylinder, means for operating said member, and means for actuating the chute to guide a charge into the cylinder before roasting and from the cylinder into said casing when the roasting operation is finished, said actuating means for the chute comprising connections between the chute and said member.

3. Roasting apparatus comprising a horizontal cylinder, a hopper above said cylinder, a rotatable drum having a pocket for receiving a charge from the hopper, said drum being mounted to turn about a vertical axis, means for periodically moving said drum, means for rotating the cylinder and connections between said last-named means and said means for periodically moving said drum, electrical means for controlling said moving means, a casing, a chute movable into one position to guide the charge from the drum to the cylinder and into another position to deliver from the cylinder to the casing, connections for actuating said chute to assume said positions, said connections comprising a rod and a cam on the drum to reciprocate the rod, switches for said electrical means, and cams on the drum to control the switches.

4. Roasting apparatus comprising a hopper, a horizontal roasting cylinder supplied from said hopper and placed below the hopper, a movable feed member between the hopper and the cylinder, said member being mounted to rotate about a vertical axis, electrically controlled means for operating said member, said hopper having an opening in its bottom, a diaphragm over said opening and switch terminals controlled by the weight of the contents of said hopper in said diaphragm.

5. Roasting apparatus comprising a hopper, a horizontal cylinder below the hopper, a rotatable drum for feeding the contents of the hopper into the cylinder, said drum being mounted to turn about a vertical axis, ratchet teeth on the drum, means for operating the cylinder and the drum comprising a cam and a lever having a pivoted pawl to engage said teeth, a magnetic coil having an armature connected to said pawl, and switches adjacent the drum and operated thereby to control said coil.

6. Roasting apparatus comprising a housing having a bin, a horizontal roasting cylinder below said bin, a rotatable feed drum between the bin and said cylinder, said drum being mounted to turn about a vertical axis, said drum having ratchet teeth on its periphery, a lever bearing a pawl to engage said teeth, a solenoid having a plunger connected to said pawl to move the pawl to actuate the drum, a switch on the housing to connect said solenoid to a supply circuit, a motor for said cylinder and gearing coupling the motor to said cylinder and lever.

7. Roasting apparatus comprising a housing having a bin, a horizontal roasting cylinder below said bin, a rotatable feed drum between the bin and said cylinder, said drum being mounted to turn about a vertical axis, said drum having ratchet teeth on its periphery, a lever bearing a pawl to engage said teeth, a solenoid having a plunger connected to said pawl to move the pawl to actuate the drum, a switch on the housing to connect said solenoid to a supply circuit, a motor for said cylinder and gearing coupling the motor to said cylinder and lever, said gearing comprising a cam rotating with said cylinder and engaging said lever.

8. Roasting apparatus comprising a housing having a bin, a horizontal roasting cylinder below said bin, a rotatable feed drum between the bin and said cylinder, said drum being mounted to turn about a vertical axis, said drum having ratchet teeth on its periphery, a lever bearing a pawl to engage said teeth, a solenoid having a plunger connected to said pawl to move the pawl to actuate the drum, a switch on the housing to connect said solenoid to a supply circuit, a cam on the drum to control said switch, a motor to operate said cylinder, a shaft for the cylinder connected to the motor and a cam on the shaft to control said lever.

9. Roasting apparatus comprising a housing having a bin, a horizontal roasting cylinder below said bin, a rotatable feed drum between the bin and said cylinder, said drum being mounted to turn about a vertical axis, said drum having ratchet teeth on its periphery, a pivoted lever bearing a pawl to engage said teeth, a solenoid having a plunger connected to said pawl to move the pawl to actuate the drum into position for loading the cylinder, a switch on the housing for said solenoid, a cam on the drum to control said switch, a motor for said cylinder gearing coupling the motor to said cylinder and lever, the drum carrying a second cam, and a second switch on the housing controlled by said last-named cam to close a circuit and energize the solenoid and continue the operation of said pawl to return the drum to starting position.

10. Roasting apparatus comprising a housing having a bin, a horizontal roasting cylinder below said bin, a rotatable feed drum between the bin and said cylinder, said drum being mounted to turn about a vertical axis, said drum having ratchet teeth on its periphery, a lever bearing a pawl to engage said teeth, a solenoid having a plunger connected to said pawl to move the pawl to actuate the drum, a switch on the housing for said solenoid, a cam on the drum to control said switch, a motor for said cylinder gearing coupling the motor to said cylinder and lever, said drum having a pocket open at the top to be filled from said bin, and said housing having a supporting floor for the drum with an outlet through which the drum delivers to the cylinder.

11. Roasting apparatus comprising a housing having a bin, a horizontal roasting cylinder below said bin, a rotatable drum between the bin and said cylinder, said drum being mounted to turn about a vertical axis, said drum having ratchet teeth on its periphery, a lever bearing a pawl to engage said teeth, a solenoid having a plunger connected to said pawl to move the pawl to actuate the drum, a switch on the housing to connect said solenoid to a supply circuit, a cam on the drum to control said switch, a motor for said cylinder in said circuit, gearing coupling the motor to said cylinder and lever, said drum having a pocket open at the top to be filled from said bin, and said housing having a supporting floor for the drum with an outlet through which the drum delivers to the cylinder, a movable chute adjacent the cylinder, under said floor, gearing to swing chute to connect the outlet to the cylinder, a rod connected to said gearing, a lever on said housing, and a cam on the drum to control the lever and the rod.

References Cited in the file of this patent

UNITED STATES PATENTS

| Number | Name | Date |
| --- | --- | --- |
| 2,089,663 | Richeson | Aug. 10, 1937 |
| 2,188,969 | Waldvogel | Feb. 6, 1940 |
| 2,572,678 | Torres | Oct. 23, 1951 |

FOREIGN PATENTS

| Number | Country | Date |
| --- | --- | --- |
| 120,871 | Austria | Jan. 26, 1931 |